No. 693,341. Patented Feb. 11, 1902.
J. B. WALKER.
HAND OILER.
(Application filed July 1, 1901.)
(No Model.)
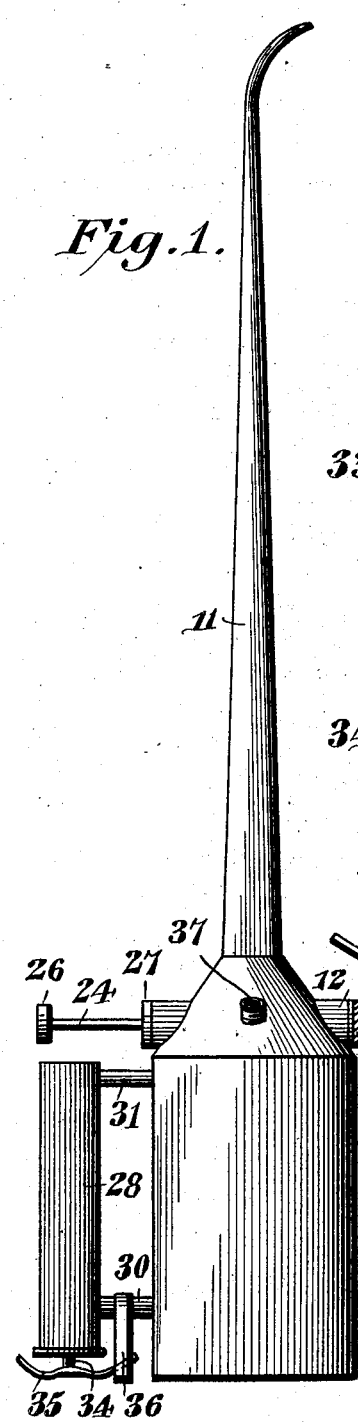
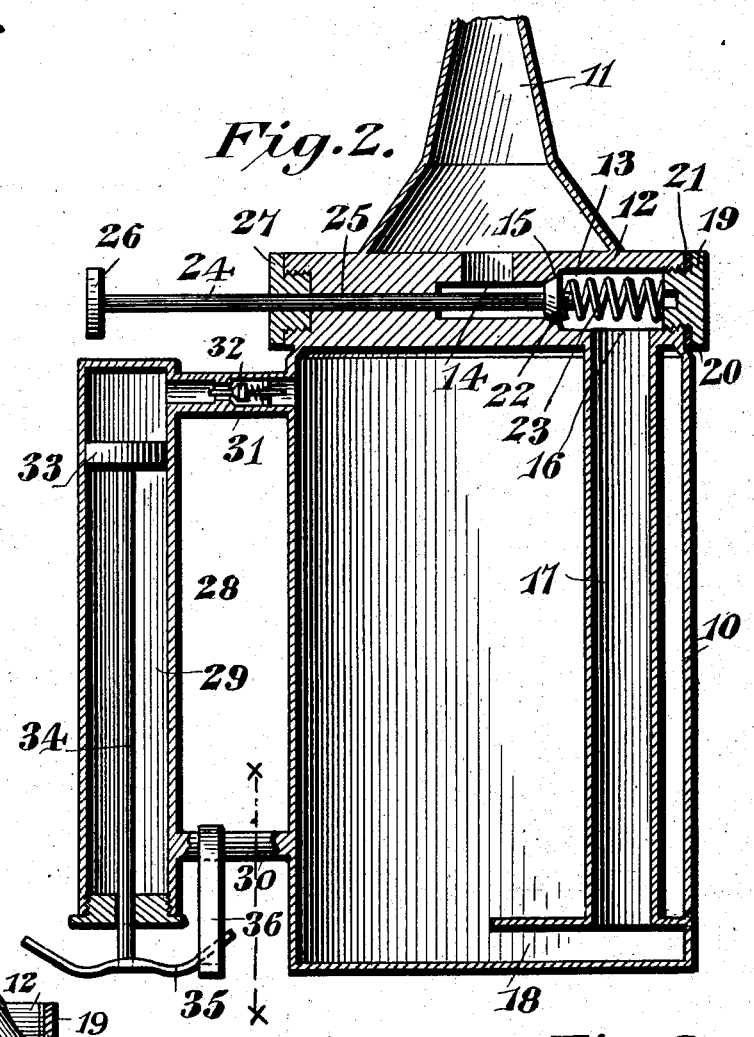
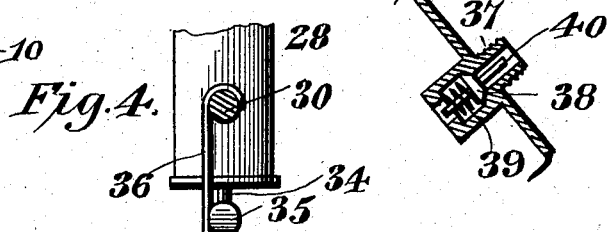
John B. Walker, Inventor
By
Attorney

UNITED STATES PATENT OFFICE.

JOHN BAYLESS WALKER, OF BESSEMER, ALABAMA, ASSIGNOR OF TWO-FIFTHS TO ED. FRED NORDMAN AND OSCAR E. RANDLE, OF BESSEMER, ALABAMA.

HAND-OILER.

SPECIFICATION forming part of Letters Patent No. 693,341, dated February 11, 1902.

Application filed July 1, 1901. Serial No. 66,717. (No model.)

*To all whom it may concern:*

Be it known that I, JOHN BAYLESS WALKER, a citizen of the United States, residing at Bessemer, in the county of Jefferson and State of Alabama, have invented a new and useful Hand-Oiler, of which the following is a specification.

This invention relates to hand-oilers; and the object thereof is to provide a novel article of this character which employs compressed air for expelling the oil or lubricant from the oil reservoir or receptacle.

More particularly, one of the features of the invention resides in an air-pump which constitutes the handle of the device and has communication with the upper portion of the receptacle, whereby the air will be introduced above the liquid, thus obviating the liability of the pump becoming filled with the same. At the same time it permits of the discharge-valve-controlling device being located in close proximity to the upper end of the handle, where it is readily accessible and will not interfere with the pump-plunger stem.

Another feature resides in means for locking the plunger-stem within the barrel, so that it is out of the way and is not liable to displacement while the oiler is being used.

Another feature relates to novel means for filling the oil-reservoir, whereby it is not necessary to remove the spout for that purpose.

The preferred embodiment of the invention is clearly illustrated in the accompanying drawings, and the construction and operation thereof are fully described in the following specification. The invention is, however, not to be limited to the exact construction shown and described, but is open to such changes and modifications as are allowed by the scope of the appended claim.

In the drawings, Figure 1 is a side elevation of the improved oiler. Fig. 2 is a longitudinal view through the same. Fig. 3 is a detail sectional view through the valve-vent nipple. Fig. 4 is a detail sectional view taken on the lines X X of Fig. 2.

Similar numerals of reference designate corresponding parts in all the figures of the drawings.

In carrying out the invention, as shown in the accompanying drawings, the usual oil-reservoir is provided and designated 10. From the upper end of this reservoir projects the tapered discharge-spout 11. A valve-casing 12 is secured transversely across the upper end of the reservoir and has a valve-chamber 13, from one end of which leads a horizontal passage-way 14, that communicates with the base of the spout. The inner end of this passage-way is contracted, whereby the valve-seat 15 is formed. An opening 16 in the lower part of the chamber communicates with a vertically-disposed oil-conducting tube 17, arranged within the oil-reservoir, and has an offset entrance-throat 18, that is located at the bottom of said reservoir. The end of the chamber opens through the end of the casing 12, but is normally closed by a screw-threaded plug 19, having a knurled flange 20, and provided with suitable interposed packing 21, that makes the joints air and liquid tight. A plug-valve 22 is slidably mounted in the chamber and is arranged to rest against the seat 15, being held there by a coiled spring 23, interposed between said valve and the inner end of the plug 19. A valve-stem 24, secured to the opposite end of the plug-valve, passes through an opening 25 and projects from that end of the casing which is opposite the plug 19, said projecting end being provided with a thumb-knob 26. This end of the casing is preferably made tight by means of a screw-collar 27.

Secured longitudinally of and upon the exterior face of the reservoir is an air-pump, (designated as a whole by the reference-numeral 28.) This pump is located directly beneath the projecting end of the valve-stem 24 and is constructed as follows: A preferably cylindrical barrel 29 is secured to the reservoir by means of arms 30 and 31, whereby said barrel is spaced from the wall of the reservoir and constitutes a handle. The upper arm 31 is hollow and forms a passage-way leading from the upper end of the barrel into the upper end of the reservoir, and a spring-pressed check-valve 32 is located in said passage-way. Slidably mounted within the barrel is a pump-plunger 33, having an operating-stem 34, that projects through the lower end of the barrel and has an offset handle 35.

This stem and the handle carried thereby are capable of a rotary as well as a sliding movement, the reason for which will presently appear. A holding device 36 in the form of a hook is secured to the lower arm 30 and has its offset end located adjacent to the lower end of the barrel.

In order to permit the confined air to escape during the filling operation, the reservoir is provided in its upper end with a valve-vent. In the preferred form shown this vent is in the form of a hollow nipple 37, the outer end of which is preferably screw-threaded and the check-valve 38, located therein, being normally held closed by a coil-spring 39 and having a stem 40, that extends into the outer end of the nipple, the outer end of said stem, however, being located within the nipple, and therefore protected against accidental operation by coming into contact with an obstruction of any sort.

The manner of using the device is as follows: To fill the reservoir with oil, it is only necessary to remove the plug 19 and pour the oil into the valve-chamber 13. This oil will gravitate down the conducting-tube and into the reservoir. In order to permit the confined air above the entrance-throat 18 to escape, the vent-valve stem 40 is pushed inwardly, and as the air escapes the oil will rise in the receptacle. When the filling operation has been completed, the plug is returned to its place and compressed air is introduced into the receptacle by means of the pump, said air being prevented from returning by the valve 32. After sufficient air has been pumped into the device the plunger and stem are moved inwardly and locked in the barrel by rotating the handle 35, so that it will be engaged over the hook. To use the device, it is only necessary for the operator to press upon the thumb-knob 26 of the controlling-valve stem, thus opening the passage-way to the spout, whereupon the compressed air will force the oil through the conducting-tube 17 and the valve-casing 12 into the spout. Should the pump for any reason become inoperative, an ordinary air-pump of any suitable kind may be applied to the nipple 37.

By this construction it will be seen that a simple oiler is provided, the supply of which can be controlled as desired. Because of the communication between the pump and the reservoir being located at the upper end of the reservoir there is no danger of the oil entering the pump, and the arrangement so disposes the controlling-valve stem and the plunger-stem that there is no interference between the two. The means for filling the reservoir is very simple and does away with the necessity of a removable spout, so that the joints may be soldered tightly and there is no danger of leakage at the same.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

In a hand-oiler, the combination with an oil-reservoir, of a discharge-spout extending from the lower end of the reservoir and projecting above the upper end thereof, an upright air-pump barrel located longitudinally upon the outer face of the reservoir and spaced from the same, constituting a handle, a valved connection between the upper end of the barrel and the upper end of the reservoir, a plunger slidably mounted within the barrel and having an operating-stem projecting from the lower end thereof, a valve controlling the passage-way through the discharge-spout and having an operating-stem, the outer end of which is located contiguous to the upper end of the pump-barrel, and a catch arranged at the lower end of the pump-barrel and adapted to be engaged by the plunger-stem to hold the latter within the barrel.

In testimony that I claim the foregoing as my own I have hereto affixed my signature in the presence of two witnesses.

JOHN BAYLESS WALKER.

Witnesses:
J. F. ROBERTSON,
R. M. MINGEN.